United States Patent [19]
Urech

[11] Patent Number: 6,011,236
[45] Date of Patent: Jan. 4, 2000

[54] METHOD AND APPARATUS FOR JOINING TWO METAL FOILS TOGETHER

[75] Inventor: Werner Urech, Kaiserstuhl, Switzerland

[73] Assignee: Elpatronic AG, Bergdietikon, Switzerland

[21] Appl. No.: 08/811,547

[22] Filed: Mar. 4, 1997

[30] Foreign Application Priority Data

Apr. 19, 1996 [CH] Switzerland ................... 995/96

[51] Int. Cl.$^7$ ................................... B23K 11/06
[52] U.S. Cl. ........................... 219/117.1; 219/83
[58] Field of Search ...................... 219/81, 82, 83, 219/84, 64, 117.1

[56] References Cited

U.S. PATENT DOCUMENTS

| | | |
|---|---|---|
| 3,654,422 | 4/1972 | Erlandson ................. 219/83 |
| 4,352,001 | 9/1982 | Ishibashi et al. ............ 219/64 |
| 4,536,637 | 8/1985 | Horiuchi et al. ............ 219/117.1 |
| 4,732,026 | 3/1988 | Ban ......................... 219/83 |
| 4,795,875 | 1/1989 | Urech ....................... 219/84 |
| 5,389,761 | 2/1995 | Kresse, Jr. ................ 219/117.1 |

FOREIGN PATENT DOCUMENTS

| | | |
|---|---|---|
| 0 134 724 | 3/1985 | European Pat. Off. . |
| 56-001281 | 8/1981 | Japan . |
| 595 177 | 1/1978 | Switzerland . |
| 2 083 774 | 3/1982 | United Kingdom . |
| 2 178 682 | 2/1987 | United Kingdom . |

*Primary Examiner*—Clifford C. Shaw
*Attorney, Agent, or Firm*—McCormick, Paulding & Huber LLP

[57] ABSTRACT

In a method for joining together two metal foils which are at least partly superimposed on one another, eg. at the margins, the metal foils are guided between two metal wires carrying an electric current and each rolling over a foil.

10 Claims, 2 Drawing Sheets

METHOD AND APPARATUS FOR JOINING TWO METAL FOILS TOGETHER

BACKGROUND OF THE INVENTION

The invention relates to a method for joining together two extremely thin metal sheets or metal foils which are at least partly superimposed on one another, eg. at the margins, and also to an apparatus for performing such a method of joining.

"Extremely thin metal sheets and foils" (hereinafter called "metal foils") are self-supporting, flexible sheets with thicknesses of between 2 $\mu$m and 0.2 mm, and in particular between 20 $\mu$m and 0.1 mm, consisting for example of stainless austenitic or ferritic materials. Their small thickness makes it difficult to join two metal foils together. This especially applies where the joint is to be made by a weld seam.

For joining together two metal foils which are superimposed one on the other, resistance roller seam welding is a known process. In the roller seam welding process the metal foils to be joined together are passed between two rollers through which an electric current, preferably an alternating current, is flowing. The flow of current through the two foils between the two welding rollers causes fusion of the area of contact of the two foils, forming a weld seam which joins the foils together. This weald seam usually consists of a succession of individual weld nuggets of a size which, if the weld seam is correctly formed, is in a certain proportion to the thickness of the metal foil and to the width of the weld. However, because the foils are very thin, it frequently happens that the weld nuggets penetrate right through to the surfaces of the sheets, thus greatly impairing the quality of the weld, or rendering it completely unusable. For these reasons, roller seam welding of metal foils is carried out at a speed below 2 m per minute, which is exceptionally slow for large-scale production, with the result that the costs of roller seam welding of metal foils are too high, and therefore uneconomic.

SUMMARY OF THE INVENTION

The problem with which the present invention is concerned is to develop a method for joining metal foils together and an apparatus therefor, by means of which a weld seam of sound quality can be produced and yet the speed at which the joint is formed is considerably increased.

The problem is solved using an intermediate wire electrode in the welding process. The wire electrode is passed around the welding rollers so that during the welding process it lies between the metal foil to be welded and the welding roller. As a result, there is no longer any direct contact between foil and welding roller.

Roller seam welding with a wire electrode is known in principle; it is used in can welding, where can bodies in the thin sheet range, ie. thicknesses between 0.12 and 0.5 mm, are fabricated. However, sheet metal for cans has special properties which are different from those of the metal foils to be joined together in accordance with the invention. Sheet metal for cans is given a metallic coating: if the coating is of tin, the material is tin-plate. Tin has a lower melting point than the actual metal to be joined, so that it liquefies before welding temperature is reached. Inevitably, therefore, tin is deposited on the rolling faces of the welding rollers. This contamination of the roller faces alters the welding parameters to an unquantifiable degree (eg. contact resistance and electrode contact area). If a wire electrode is used which is fed in new condition to the welding roller, passes between roller and can sheet during welding, and leaves the roller to be disposed of, the contamination which continuously occurs is continuously removed along with it; the welding process remains undisturbed and free from defects. A drawback is that, besides the increased welding machine construction cost, a length of wire is consumed equal to the length of the weld seam produced, incurring considerable cost when production is on an industrial scale.

For the joining together of foils, such roller seam welding with an intermediate wire electrode, with the increased fixed and variable costs thereby incurred, has not been contemplated in the past, as a metal foil of the kind described has no additional metallic coating with a lower melting point than the material of the foil (or only has a spontaneously formed coating which occurs naturally through oxidation of the foil material and whose thickness may be affected by manufacturing processes). Then again, a metal foil of the kind described may merely be covered with a corrosion-preventing film (of chromium oxide for example) possessing a higher melting point than the material of the metal foil itself.

Surprisingly it has been found that this method which is necessary in can production also produces excellent weld seams in the joining together of two metal foils, even though, to the knowledge of a person skilled in the art, the wire electrode has no function here, and is therefore unnecessary.

The preferred material for the intermediate wire electrodes is electrolytic copper, which has a considerably higher electrical and thermal conductivity than the welding roller materials employed in the roller seam welding process which does not use an intermediate wire electrode. The conductivity of electrolytic copper is for example about double that of the welding roller material normally used for welding stainless steels, consisting of an alloy of copper, cobalt and beryllium. The higher thermal conductivity results in much better removal of heat from the surface of the sheet. This appears to reduce the risk of melt-through of the foils. The much lower yield point or hardness of electrolytic copper, which is for example only about one third of that for Cu—Co—Be alloys, causes the surface of the intermediate wire electrode to deform under welding pressure, resulting in much better conformation of the current contact surface to the surface structure of the metal foil and hence a reduction in the contact resistance between the electrode contact surface and the sheet surface, and also a more uniform current density over a better-defined region in the foils, which, according to the applicant's preliminary investigations, helps to moderate the rise in temperature at the surface of the foil, so that melt-through of the foil takes longer to occur.

The speed of travel as such is limited by the welding frequency, which determines the spacing of the overlapping weld nuggets. A further factor is, as mentioned, the cooling of the foil surfaces, which slows down the melt-through of the weld nuggets towards the exterior. Since the cooling of the surface can be greatly improved by the intermediate wire electrodes used in accordance with the invention (owing to the geometrical conditions which prevail in the case of foils), it is possible to raise the welding frequency in order to achieve higher speeds of travel. For example, with welding frequencies of 300–400 Hz, speeds of travel of 15–20 m/min can be attained.

The efficacy of the method is preferably increased further by giving the metal wire a microprofile before it is rolled over the foil. For example, this may be done with abrasive-coated paper forming longitudinal grooves in the wire. These longitudinal grooves appear to have the advantage of making a larger surface area available for contact with the metal foil, again increasing not only thermal conductivity but also electrical conductivity.

If the weld seams cross at a point where the foils are to be joined together, the risk of melt-through increases; all the more so if the foils are thin. Surprisingly, this risk can be lessened if oxidation of the earlier seam is prevented, or is removed before overwelding takes place. According to the applicant's preliminary investigations, when an existing seam is overwelded by another seam which crosses it, the oxide film, which has the effect of increasing resistance, disrupts the welding process, and melt-through can occur at the crossing point. Preferably, therefore, at least the earlier seam is freed from oxide film at the crossing point, preferably by brushing, before overwelding by the seam which crosses it.

Metal foils of this kind which are formed into a metal envelope by having their margins joined together all round may for example be used for the manufacture of an insulating element for lining refrigerators. Refrigerators are still being lined with insulating material by insertion of polystyrene or by injection of polyurethane foam. The latter is especially undesirable on environmental grounds. Therefore, increasing use is now being made of glass fibre panels placed in a metal envelope which is hermetically sealed by welding and sequentially evacuated. These have an improved insulating effect with less thickness, so that more storage space is available inside the refrigerator or cold room. However, the vacuum in these insulating elements must last for at least 10 years. With the method according to the invention, such insulating elements can be produced at low cost, the primary consideration being that the weld seam is perfectly sealed, and, in particular, vacuum-tight.

An apparatus according to the invention for joining together two metal foils which are at least partly superimposed one on the other, eg. at the margins, makes use of two metal wires which are each guided around a welding roller, and between which the two foils are welded, with the wires rolling over the foils. A device for producing a microprofile on the wire is preferably arranged ahead of at least one of the rollers; for the sake of simplicity, this device may consist of an abrasive-coated paper.

BRIEF DESCRIPTION OF THE DRAWINGS

Further advantages, features and details of the invention will be apparent from the following description of preferred embodiments given by way of example and with reference to the drawings, in which.

DESCRIPTION OF THE PREFERRED EMBODIMENTS

Figure 1:
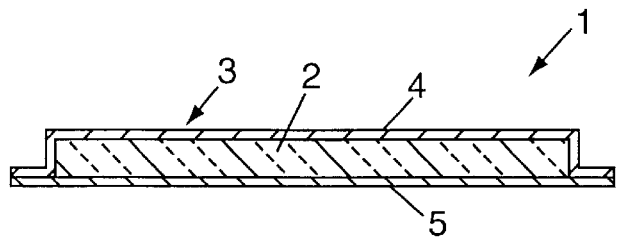
FIG. 1 is a cross-section through an insulating element, in particular for use in refrigerator insulation.
Figure 2:
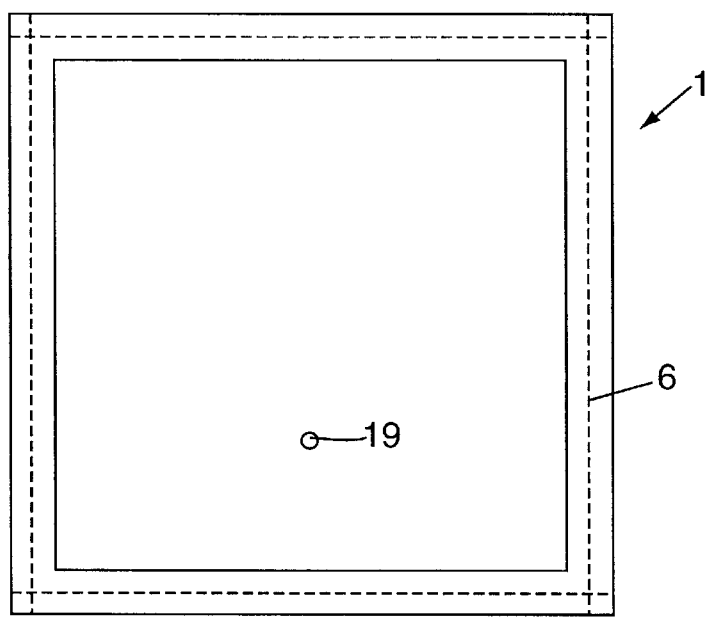
FIG. 2 is a top view of the insulating element of FIG. 1.

An insulating element 1 for use in refrigerator insulation comprises, as shown in FIG. 1, a glass fibre panel 2 surrounded by a metal envelope 3. This metal envelope 3 consists of a cover foil 4 and a base foil 5. The cover foil 4 and base foil 5 are superimposed on each other at their margins, where they are joined together by corresponding weld seams 6, which are indicated in FIG. 2 merely by broken lines.

Figure 3:
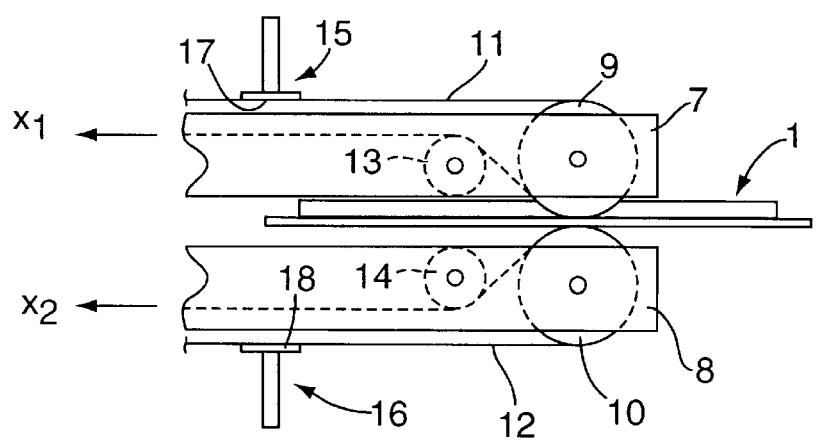
FIG. 3 is a schematic side view of part of an apparatus for fabricating the insulating element of FIGS. 1 and 2.

The joining together of the cover foil 4 and base foil 5 of the insulating element 1 is performed in an apparatus, only part of which is shown in FIG. 3. Rollers 9 and 10 are mounted on upper and lower bracket arms 7 and 8 respectively, a metal wire 11 and 12 respectively at least partly wrapping around each roller. Downstream of the rollers 9 and 10, the wires 11 and 12 are led over further guide rollers 13 and 14 respectively.

To produce the weld seam 6 in the margins of the cover foil 4 and base foil 5, the insulating element 1 is fed between the rollers 9 and 10, with the wires 11 and 12 on either side rolling over the cover foil 4 and base foil 5 respectively. The wires 11 and 12 are drawn off in the directions $x_1$ and $x_2$ respectively.

Ahead of the rollers 9 and 10, devices 15 and 16 for producing a microprofile on the wire are associated with the wires 11 and 12 respectively. In a simple embodiment, the devices 15 and 16 for profiling the wires 11 and 12 each consist of abrasive-coated paper 18 covering a plunger face 17 of the device 15 or 16 respectively. The devices 15 and 16 for providing a microprofile on the surface of the wires 11 and 12 respectively are arranged so that the profiled surface of the wire rolls over the cover foil 4 and base foil 5 respectively.

For welding metal foils of 0.075 mm to 0.1 mm in thickness, a supply current of 500A to 3000A may be employed. The AC frequency may differ from mains frequency and the current may be given a form other than a sine wave.

After the cover foil 4 and base foil 5 have been joined together at the margins by the weld seams 6, the insulating element 1 is evacuated through an opening in the cover foil 4, not shown in detail, which is then closed with a seal 19.

Figure 4:
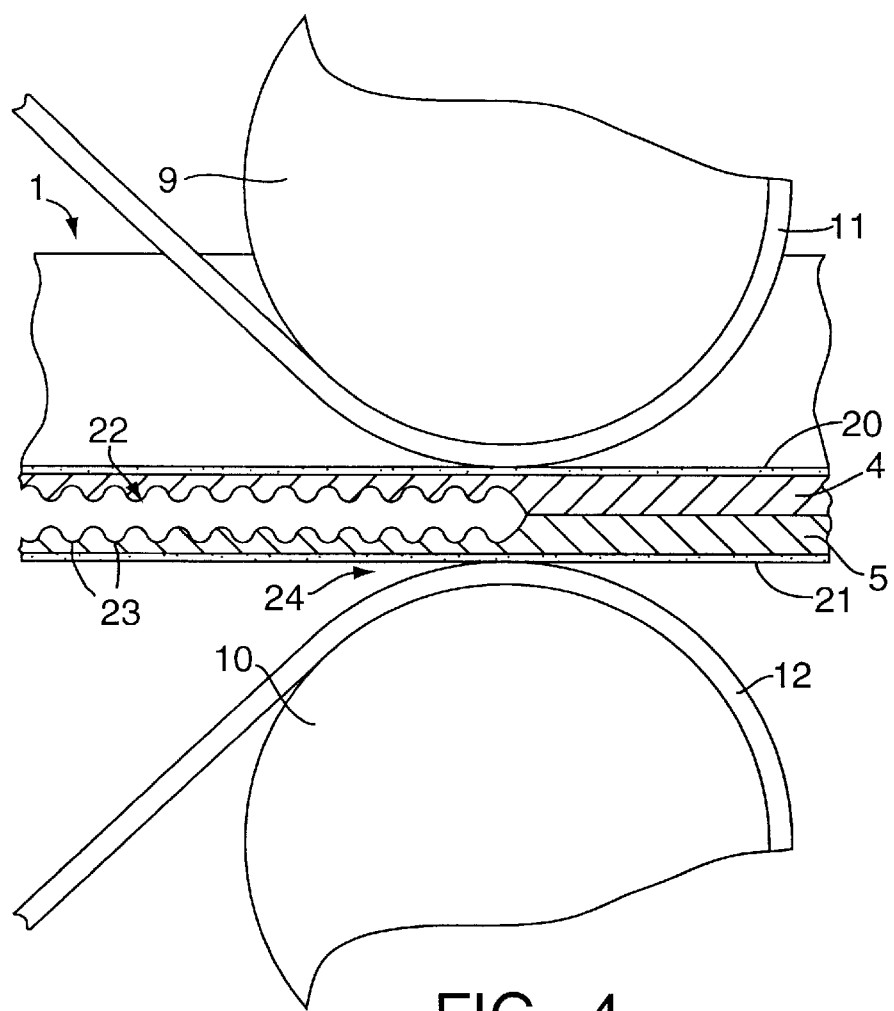
FIG. 4 is a cross-section, drawn to a larger scale, through part of the apparatus of FIG. 3 in the working position during fabrication of an insulating element.
Figure 5:
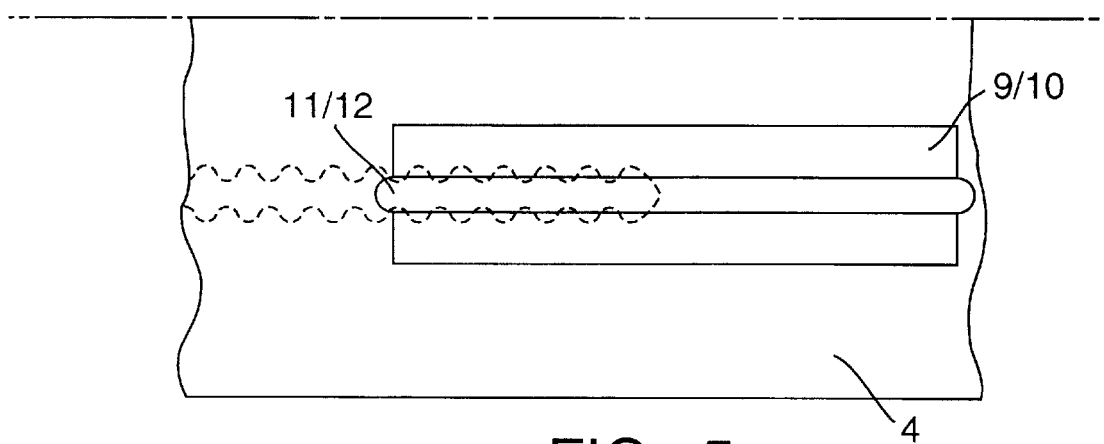
FIG. 5 is a plan view of the portion of the apparatus drawn to the larger scale of FIG. 4.

In FIGS. 4 and 5 the region of the joint between the cover foil 4 and base foil 5 is drawn on an enlarged scale. Here it will be noticed that both the cover foil 4 and the base foil 5 have an oxide film 20 and 21 respectively, consisting of a compound which has a higher melting point than that of the actual metal foil 4 and 5 respectively.

Passage of electric current through each wire 11 and 12 causes fusion in a zone between the two foils 4 and 5, which are joined together by a weld seam 22 in this zone. This weld seam 22 comprises individual weld nuggets 23 formed as the insulating element 1 is passed through a gap 24 between the wires and alternating current is passed through the wires 11 and 12.

What is claimed is:

1. A method for joining together two metal foils which are at least partly superimposed on one another, comprising
    passing said metal foils between two metal wires carrying an electric current; and
    rolling said metal wires over a respective one of said foils;
    whereby said metal foils form an envelope of a body in which weld seams running along margins of the body cross at least once, at least the earlier seam at the crossing point being freed from oxide film before overwelding by the seam which crosses it.

2. Method according to claim 1, characterised in that a wire (11,12) is chosen having a hardness such that it is deformed when rolled on the foil (4,5).

3. Method according to claim 1, characterised in that the wire (11,12) is given a microprofile before being rolled on the foil (4,5).

4. Method according to claim 3, characterised in that the wire (11,12) is treated with an abrasive medium (18).

5. Method according to claim 1, characterised in that the metal foil (4,5), prior to being joined, has on the side facing the wire (11,12) a coating of a film (20,21) of material with a melting point equal to or above that of the metal foil (4,5).

6. Method according to claim 1, characterised in that metal foils (4,5) provide an envelope of a body (2) in which weld seams running along margins of the body cross at least once, at least the earlier seam at the crossing point being freed from oxide film before overwelding by the seam which crosses it.

7. Method according to claim 1, characterised in that at least the outer surfaces of the metal foils (4,5) are at least partly shielded from oxidation during the welding process.

8. A method according to claim 1, characterized in that said current is in the range of 500A to 3000A and said foils each have a thickness of 0.075 mm to 0.1 mm.

9. Method according to claim 1, characterised in that the current used for welding has a frequency which differs from the mains frequency.

10. Method according to claim 1, characterised in that the current may have any desired current form which differs from a sine form.

* * * * *